July 8, 1941.    L. J. EPPS    2,248,344
BUMPER
Filed March 29, 1939
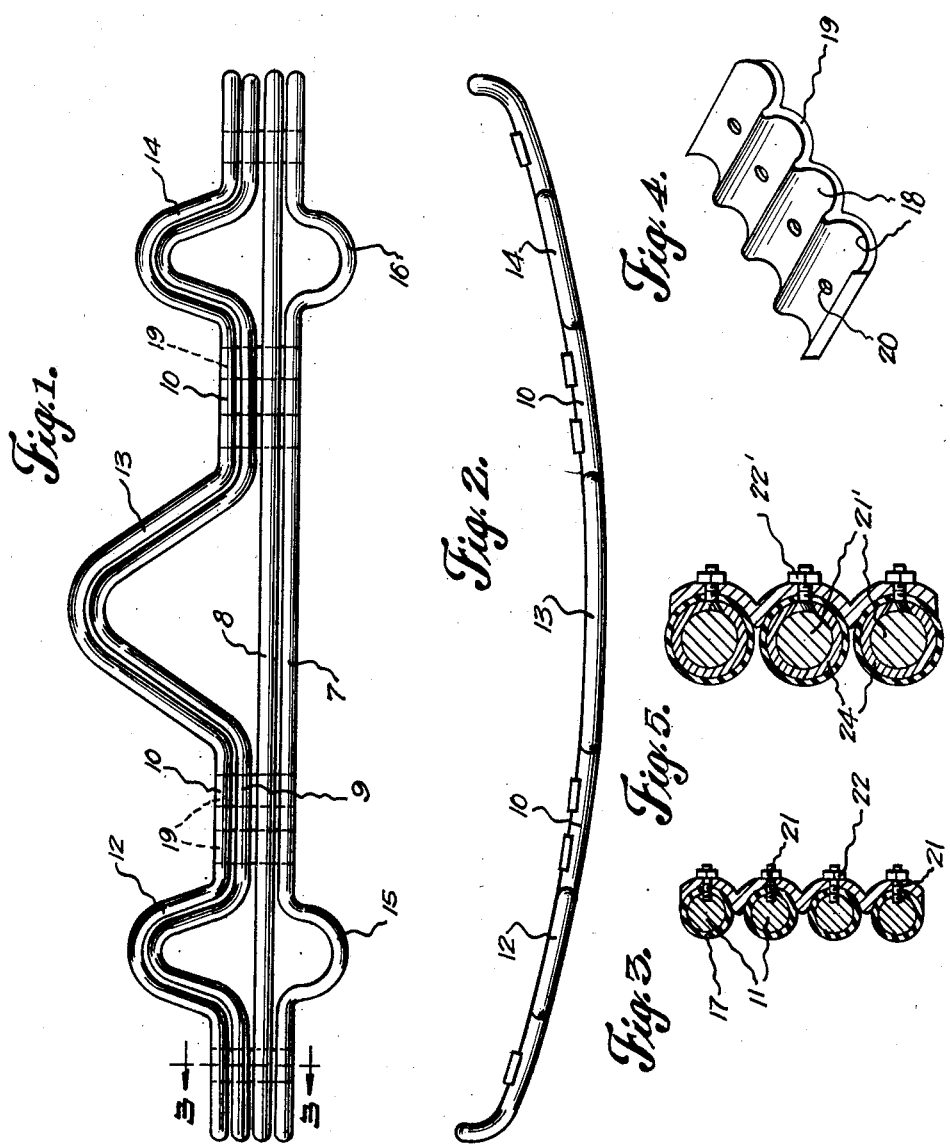
INVENTOR.
LOUIS J. EPPS
BY Thos. L. Donnelly
ATTORNEY.

UNITED STATES PATENT OFFICE 2,248,344

BUMPER

Louis J. Epps, Detroit, Mich.

Application March 29, 1939, Serial No. 264,792

3 Claims. (Cl. 293—55)

My invention relates to a new and useful improvement in a bumper adapted for use on vehicles and ordinarily located at the front and rear thereof to protect the vehicle from impact with other bodies. While I have illustrated the invention adapted for an elongated body, which would extend the entire width of the vehicle, it is to be understood that the invention is adapted also for bumperettes, and other short types of bumpers placed at the corners, or strategic positions, which are more liable to impact with other bodies.

It is an object of the present invention to provide a bumper of this class, which will be simple in structure, economical of manufacture, durable, compact, light, easily and quickly installed, highly efficient in use, and quickly and easily repaired in the event of damage with a minimum amount of expense.

Another object of the invention is the provision of a bumper of this class having a covering of flexible, yieldable material such as rubber, or the like.

In the construction of bumpers, it is now quite customary to mount on the bumper a plurality of transversely extending bars which would project beyond the sides of the bumper proper so as to engage articles which otherwise would over-ride or under-ride the bumper. It is an object of the present invention to provide a bumper having a plurality of laterally projecting extensions formed as a part of the bumper.

Other objects will appear hereinafter.

The invention consists in the combination and arrangement of parts hereinafter described and claimed.

The invention will be best understood by a reference to the accompanying drawing, which forms a part of this specification, and in which, Fig. 1 is a front, elevational view of the invention.

Fig. 2 is a top plan view of the invention.

Fig. 3 is a sectional view taken on line 3—3 of Fig. 1.

Fig. 4 is a perspective view of a clip used on the invention.

Fig. 5 is a slightly enlarged transversely sectional view showing a slightly modified form of fastening.

I have illustrated a bumper provided with a plurality of bars or rails 7, 8, 9, and 10. It is believed obvious that the number of bars or rails mounted may be varied depending upon the strength and weight of the bumper desired to construct. These bars or rails are preferably formed from rods 11 and the center rod 8 is a straight body. The center upper rods 9 and 10 are bent outwardly to provide the outwardly extending projections 12, 13, and 14, the central outer projection 13 being of greater height than the side projections 12 and 14. The lowest rod is bent outwardly as at 15 and 16 to provide the outward projections. These lateral projections above and below the bumper serve as abutment members for engaging objects, which otherwise would over-ride or under-ride the bumper.

It is preferred that these rods be encased in a casing 17 of rubber or other suitable yieldable, flexible material, such as leather, or the like. The purpose of the covering is to render the shock less noticeable when the vehicle contacts an obstacle, and to eliminate noise and damage to the bumper, itself. Moreover, the casing or covering for the rods may be made in various colors so that it becomes possible to build a bumper of this class which will be ornamental and distinctive in appearance. This would permit the color of the bumper to conform to the color scheme of an automobile on which used. The rods 7, 8, 9, and 10 are all separate from each other, excepting that they are secured by a suitable clip which comprises a plate having a plurality of trough-like grooves or recesses 18 formed in one of its faces. Through this plate 19 at each of the grooves extends an opening 20 permitting the passage of a stud 21 thereto, this stud being secured to the rod and adapted for reception of a nut 22. The clip 19 may be fastened to a suitable supporting bracket in any desirable and well-known manner. It is obvious that if one of the rods should become bent or the casing chipped therefrom, or otherwise damaged, it may be removed and repaired without disturbing the remaining structure of the bumper. This lends itself to economy in bumper cost. It is believed obvious that the assembly of the bumper is a simple operation and that its mounting on a vehicle may be easily and quickly effected.

In Fig. 5, I have shown a ring 24 which is adapted to embrace the rod and which carries the stud 21' adapted for reception of the nut 22'.

The bumper lends itself for different forms of construction, and may be used as a bumper extending transversely of the vehicle the full width thereof, or it may be built to various sizes so as to lend itself to the protection of the vehicle fender, for use as a grill bumper, rear bumper, or a trunk bumper.

It is believed obvious that the multiple rod constructions, illustrated, may be used without the covering of a flexible, yieldable material, although it is referred that this covering be used. It is also believed obvious that when the flexible covering is used, it need not entirely surround the metal, but may be confined to covering the front only, or contact face thereof.

While I have illustrated the rods as being circular, in cross-section, it is believed obvious that they may be made in different shapes, and tubular if desired.

It is also believed obvious that two or more rods may be formed from a single piece of material by doubling it upon itself.

It is recognized that various departures from the construction illustrated may be resorted to, but it is the intention to include such variations and departures as may come within the scope of the claims appended hereto.

What I claim as new is:

1. In a bumper of the class described, a structure embodying an elongated straight rod; a plurality of rods, said rods being positioned on opposite sides of said straight rod, said rods extending in parallel relation and in vertical alignment, a plurality of rods above said straight rod being bowed outwardly at spaced points intermediate their ends, the inwardly positioned bows nesting in the adjacent outwardly positioned bows.

2. In a bumper of the class described, a structure embodying an elongated straight rod; a plurality of rods, said rods being positioned on opposite sides of said straight rod, said rods extending in parallel relation and in vertical alignment, a plurality of rods above said straight rod being bowed outwardly at spaced points intermediate their ends, the inwardly positioned bows nesting in the adjacent outwardly positioned bows; and a rod beneath said straight rod being bowed downward intermediate its ends in alignment with the upwardly bowed portions.

3. In a bumper of the class described, a structure embodying an elongated straight rod; a plurality of additional rods, said additional rods being positioned on opposite sides of said straight rods, said rods extending in parallel relation and in vertical alignment, a plurality of said additional rods above said straight rod being bent outwardly at spaced points intermediate their ends to provide a plurality of spaced bows, the bows on the inwardly positioned rods nesting in the bows of the adjacent outwardly positioned rods, one of said bows spanning the transverse medial line of said structure; and means for securing said rods together.

LOUIS J. EPPS.